(12) United States Patent
Burke et al.

(10) Patent No.: US 8,143,584 B2
(45) Date of Patent: Mar. 27, 2012

(54) RADON MONITOR

(75) Inventors: Joseph P. Burke, West Chicago, IL (US); Steven L. Finkelman, Evanston, IL (US); Gerald E. Cohn, Evanston, IL (US)

(73) Assignee: Radon Technologies, Inc., West Chicago, IL (US)

( * ) Notice: Subject to any disclaimer, the term of this patent is extended or adjusted under 35 U.S.C. 154(b) by 529 days.

(21) Appl. No.: 12/365,002

(22) Filed: Feb. 3, 2009

(65) Prior Publication Data

US 2009/0230305 A1    Sep. 17, 2009

Related U.S. Application Data

(60) Provisional application No. 61/025,986, filed on Feb. 4, 2008.

(51) Int. Cl.
*G01T 1/00* (2006.01)

(52) U.S. Cl. .................................. 250/370.02

(58) Field of Classification Search .............. 250/370.02
See application file for complete search history.

(56) References Cited

U.S. PATENT DOCUMENTS

| | | |
|---|---|---|
| 3,564,245 A | 2/1971 | Koehler |
| 3,922,555 A | 11/1975 | Chapuis et al. |
| 4,055,762 A | 10/1977 | Durkin |
| 4,469,945 A | 9/1984 | Hoeberechts et al. |
| 4,484,076 A | 11/1984 | Thomson |
| 4,489,315 A | 12/1984 | Falk et al. |
| 4,607,165 A | 8/1986 | Burghoffer et al. |
| 4,853,536 A | 8/1989 | Dempsey et al. |
| 4,859,865 A * | 8/1989 | Vandenburgh ................. 250/253 |
| 4,871,914 A * | 10/1989 | Simon et al. .............. 250/370.02 |
| 4,888,485 A | 12/1989 | Becker et al. |
| 4,891,514 A * | 1/1990 | Gjerdrum et al. ............. 250/255 |
| 4,992,658 A | 2/1991 | Ramsey, Jr. et al. |
| 7,317,185 B2 * | 1/2008 | Kleefstra ....................... 250/253 |
| 2007/0139208 A1 * | 6/2007 | Kates ............................. 340/602 |

* cited by examiner

*Primary Examiner* — Constantine Hannaher
(74) *Attorney, Agent, or Firm* — Michael Best & Friedrich LLP

(57) ABSTRACT

A radon monitor includes a housing defining a housing cavity and having an opening in an exterior wall that is in fluid communication with the housing cavity to allow air to diffuse into and out of the housing cavity. The monitor also includes input and output units and a circuit board that is positioned in the housing cavity and supported by the housing. A passive, non-electrically powered sampling chamber defines a chamber cavity and is coupled to the circuit board. The circuit board defines a plurality of apertures that allow air to diffuse between the housing cavity and the chamber cavity. A detector for detecting radon is supported by the circuit board and positioned in the chamber cavity.

27 Claims, 10 Drawing Sheets

RADON MONITOR

CROSS REFERENCE TO RELATED APPLICATION

This application claims the benefit of and priority to U.S. Provisional Patent Application No. 61/025,986, filed Feb. 4, 2008, the entire contents of which are hereby incorporated by reference herein.

FIELD OF THE INVENTION

The present invention generally relates to radon monitors and methods and, more particularly, to low voltage radon monitors including a passive detection chamber, and methods for monitoring or detecting radon with the same.

BACKGROUND

Radon is a radioactive gas that is colorless, odorless, and tasteless, and is formed by the natural radioactive decay of uranium in soil, rock, and water. More particularly, Uranium 234 decays into Radium, which then decays into Radon gas, which then decays into daughter particles of Polonium 218, Lead 214, Bismuth 214, Polonium 214, and Lead 210. Upon decay of Radon gas, an alpha particle is produced that has an energy level of about 4.5 MeV to 5.5 MeV (million electron volts). Alpha particles can travel in air up to approximately 3.8 centimeters and can be easily stopped by as little as a piece of paper. When alpha particles contact a surface, they transfer their energy into the surface.

Radon gas is prevalent in buildings having basements or other portions of buildings on and below the surface of the ground. Studies have shown that exposure to radon gas at sufficient concentrations can cause heath problems, including among other things, lung cancer. Radon daughter particles can plate onto dust or smoke, which, when inhaled into the lungs, can stick to a surface of the lungs. When radon and its daughter particles are in intimate contact with the lung cells, the alpha, beta, and gamma particles emitted by radon and the daughter particles can cause mutation of the lung cells and initiate cancer. Accordingly, having the capability to monitor and determine radon gas levels in buildings is important for the health of its occupants.

The Environmental Protection Agency ("EPA") has established an action level threshold of radon gas which is 4 picocuries (pCi) per hour per liter of air. Countries other than the United States may have hazard thresholds different than the threshold established by the EPA. A picocurie is a unit of radiation that indicates the number of radioactive decays. A picocurie is one million millionth, or a trillionth, of a curie, and represents about 2.2 radioactive particle disintegrations (decays) per minute per liter of air. Therefore, 4 picocuries would be 8.8 disintegrations (decays) per minute per liter of air.

Radon gas monitoring has become an integral component of real estate transactions in some states. Prior to closure of a real estate transaction in certain states, an inspector conducts a radon gas test on the premises to determine radon gas levels. This radon gas test can be conducted in a few manners. A first manner for testing radon gas levels includes using kits purchasable by consumers. Such kits include a short-term radon gas charcoal test kit and a long-term radon alpha track test kit. The short-term radon gas charcoal test kit uses a container that contains a quantity of granular activated charcoal, which absorbs the radon gas entering the canister from the surrounding air. At the end of the radon gas test period, the canister is sealed and sent to a laboratory for analysis. The long-term radon alpha track test kit includes a vessel with an internal piece of film that records the impacts of alpha particles produced by the decay of radon and its decay by-product, polonium. At the end of the radon gas test period (approximately 90 days), the radon testing kit is sent to a laboratory where the alpha tracks on the film are counted, radon concentration is computed, and analysis is reported. Such kits are relatively inexpensive, but are often times extremely inaccurate and inconsistent.

A second manner of detecting radon gas levels includes an AC powered electronic device such as that disclosed in U.S. Pat. No. 4,871,914. These types of radon monitors are relatively expensive and are generally only economical to purchase by professional radon gas inspectors who continually utilize the monitors to generate a steady flow of revenue. Such radon gas monitors are generally not economical for purchase by a typical home owner. AC power is necessary for such radon detectors because they include a powered sampling unit, in which samples are taken, that requires constant and significant quantities of power. Such a powered sampling unit is energized and draws, attracts, or otherwise influences radon gas or alpha particles into the sampling unit for sampling. Typical powered sampling units require greater than 250 volts of electrical power, which can present a shock hazard if the testing unit housing is broken. Because monitors with powered sampling units require AC power provided by a household outlet, it is often difficult to position such monitors in crawl-spaces or similar spaces that are rarely wired for AC power.

Accordingly, a need exists for an accurate, inexpensive radon gas monitor that can be powered for extended periods of time without a direct connection to an AC power source.

SUMMARY

In some embodiments, the invention provides an apparatus for detecting radon in air that includes a housing defining a cavity, a passive, non-electrically powered sampling chamber supported by the housing, and a divider that is supported by the housing and that defines a boundary between the cavity and the chamber. The divider includes a plurality of apertures to allow air flow between the cavity and the chamber. The apparatus also includes a detector for detecting radon in the chamber.

In some embodiments, the invention provides a radon monitor that includes a housing defining a housing cavity and having an opening in an exterior wall that is in fluid communication with the housing cavity. The opening allows air to diffuse into and out of the housing cavity. The radon monitor also includes an output unit supported by the housing and an input unit supported by the housing. The input unit is operable to activate and deactivate the radon monitor. The radon monitor also includes a circuit board that is positioned in the housing cavity and supported by the housing, and a passive, non-electrically powered sampling chamber defining a chamber cavity. The circuit board defines a plurality of apertures, and the sampling chamber is positioned in the housing cavity for fluid communication between the chamber cavity and the housing cavity by way of the apertures in the circuit board, which allows air to diffuse between the housing cavity and the chamber cavity. A detector that is supported by the circuit board and at least partially positioned in the chamber cavity detects radon.

In some embodiments, the invention provides an apparatus for detecting radon in air that includes a housing defining a cavity, a sampling chamber supported by the housing, and a detector for detecting radon in the chamber. The apparatus also includes a self-contained power supply that is the exclusive source of electrical power for the apparatus. The power supply is supported by the housing.

Independent features and independent advantages of the present invention will become apparent to those skilled in the art upon review of the detailed description and drawings.

Figure 1:
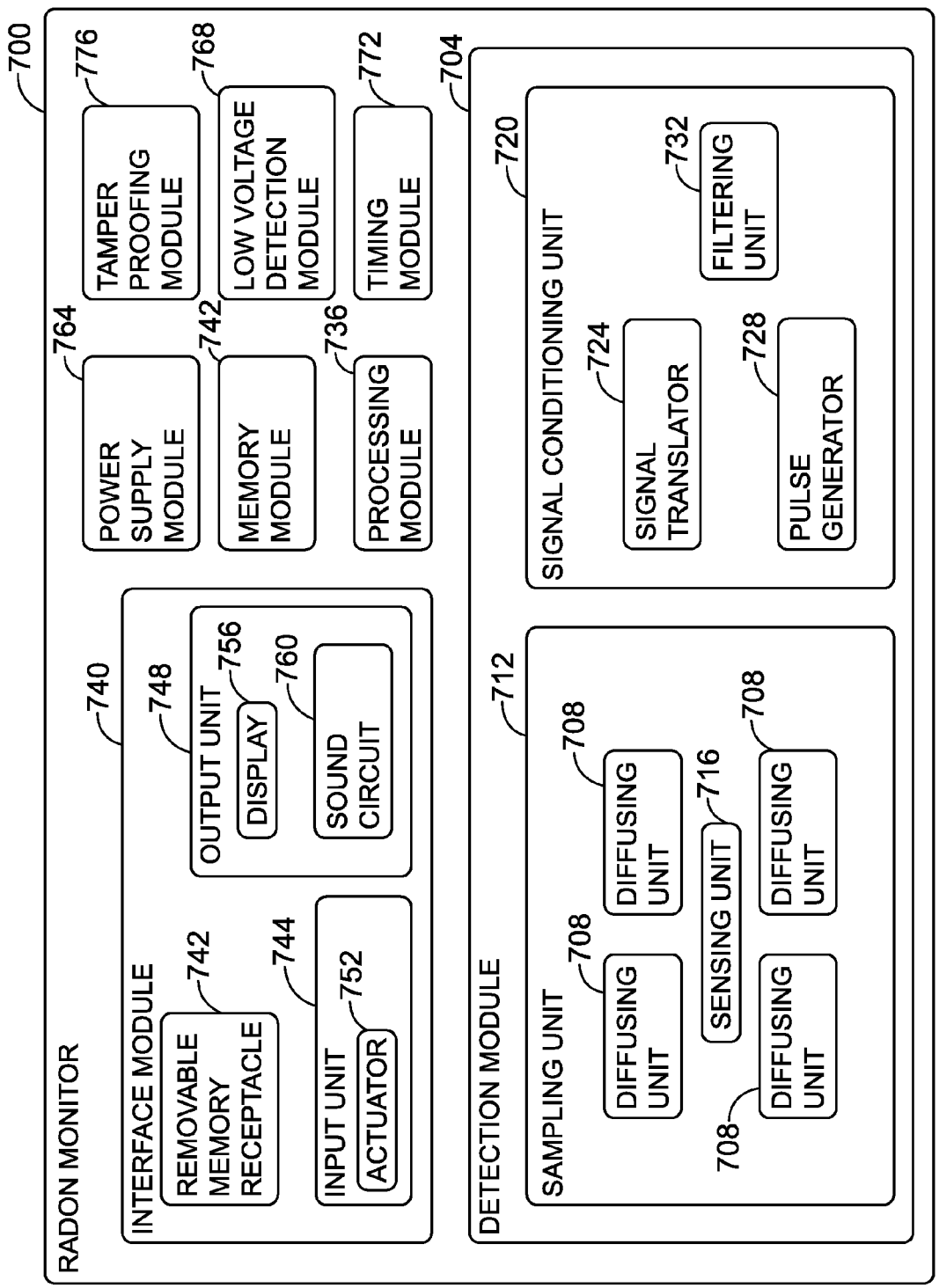
FIG. 1 is a system block diagram of a radon monitor.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

As should also be apparent to one of ordinary skill in the art, the systems shown in the figures are models of what actual systems might be like. As noted, many of the modules, units, and/or logical structures described are capable of being implemented in software executed by a microprocessor or a similar device or of being implemented in hardware using a variety of components including, for example, application specific integrated circuits ("ASICs"). Terms like "processing module" may include or refer to both hardware and/or software. Thus, the claims should not be limited to the specific examples or terminology or to any specific hardware or software implementation or combination of software or hardware.

DETAILED DESCRIPTION

With reference to FIG. 1, a system block diagram of a radon monitor 700 is illustrated. The radon monitor 700 includes a detection module 704 to detect an amount of radon gas present in air in a surrounding environment. In the illustrated embodiment, the detection module 704 includes a plurality of diffusion units 708 through which radon gas diffuses into a sampling unit 712. In some embodiments, the sampling unit 712 includes a fixed volume metal chamber, detailed hereinafter. In the illustrated embodiment, the diffusion units 708 include membranes and apertures populated adjacent a sensing unit 716, such as, for example, a positive-intrinsic-negative ("PIN") junction photodiode to detect a presence of energy, such as, for example, from an alpha particle from decayed radon gas. Other exemplary sensing units 716 may include cascade photodiodes, charged surface semiconductors, CCD photo detectors, CMOS photo detectors, and the like. Once the sensing unit 716 has detected the presence of energy, the sensing unit 716 generates a signal for further processing.

The detection module 704 also includes a signal conditioning unit 720 to condition the signal received from the sensing unit 716. In addition to the alpha particles that are detected to produce radon measurements, decaying daughter particles also emit beta and gamma particles, which may also be detected by the detection module 704. The signal conditioning unit 720 is therefore provided to filter the signals provided by the sensing unit 716 to reduce or eliminate the signatures of the beta and gamma particles. In the illustrated embodiment, the signal conditioning unit 720 includes an optional signal translator 724 that translates the signal received from the sensing unit 716 from one format into another format acceptable for further processing, a pulse generator 728, and a signal filtering unit 732. In some embodiments, the signal translator 724 includes a transimpedance circuit that translates the signal, such as a current signal, into another format, such as a voltage signal. In cases where the sensing unit 716 generates a signal with a format that is acceptable for further processing, the signal translator 724 becomes an optional component for the signal conditioning unit 720. The pulse generator 728 converts the signal from either the signal translator 724 or the sensing unit 716, which is an analog signal into a digital signal for further digital processing, detailed hereinafter. The filtering unit 732 filters any direct-current ("DC") signals that can exist, for example, between components such as the signal translator 724 and the pulse generator 728, limits frequency bandwidth of the signal, adjusts impedance, and shapes the signal to accentuate the alpha particle signature while attenuating the beta and gamma particle signatures.

The radon monitor 700 also includes a processing module 736 to process the digital signals received from the detection module 704. In some embodiments, the processing module 736 is capable of operating in an awake mode (or high power mode), and a sleep mode (or low power mode). Based on options programmed into the processing module 736, or received from an interface module 740, the processing module 736 also processes the digital signals received from the detection module 704 to determine a radiation level, and outputs signals indicative of the determined radiation level and the options selected, for example, for display purposes. In some embodiments, the processing module 736 is preprogrammed to process the radiation level minimally to conserve electrical power. In some embodiments, the processing module 736 also stores and retrieves data indicative of the determined radiation level internally with an internal memory and/or externally with an external memory, generically and collectively referred to as a memory module 742. In the illustrated embodiment, the processing module 736 includes a microcontroller, such as, for example, PIC16F689 and an external memory, such as, for example, an EEPROM. Other microcontrollers and other external memory can also be used in other embodiments. In some embodiments, the radon monitor 700 may include a removable memory to provide a portion of the external memory of the memory module 742 in order to archive or facilitate transport of the stored data without transport of the entire radon monitor. Exemplary removable memories include, for example, a secure digital card, thumb drive, portable hard drive, memory stick, and the like. In such cases, the radon monitor 700 includes a removable memory receptacle 742 to receive a removable memory device and/or a port for interfacing with the removable memory device. Also, after removal of the removable memory from the removable memory receptacle or port 742, another removable memory device may be inserted into the removable memory receptacle 742 or connected to the port 742 to replace the removed removable memory device. With the new removable memory inserted into or connected to the radon monitor 700, data sampled by the radon monitor 700 can continue to be stored.

The interface module 740 includes an input unit 744 to receive input selections from a user, and an output unit 748 to output signals in response to the signals generated by the processing module 736. In the illustrated embodiment, the input unit 744 includes an actuator 752 to receive input selections from a user. Other embodiments may include as an input unit 744 one or more keypads, switches, mechanical keys, remote control devices, smart cards, RF identification tags, and the like.

In response to the input selected on the input unit 744, the input unit 744 produces a selection signal which wakes the processing module 736 to generate one or more output signals that drive the output unit 748. For example, in the illustrated embodiment, the output unit 748 includes a display 756 that displays information such as the determined radiation level in response to the output signals. Examples of display 756 include a liquid crystal display ("LCD"), an array of light emitting diodes ("LED"), and the like. In some embodiments, the display 756 also optionally includes a serial interface or a wireless interface for connecting the radon monitor 700 to a computer for external display, control, monitoring, or other purposes. Exemplary serial interfaces include, for example, RS-232, USB, and the like. Exemplary wireless interfaces employing protocols include, for example, wireless local area networks ("WLAN") such as WiFi, personal area networks ("PANs") including Bluetooth, and radio frequency ("RF") links such as XBee radio links, and the like. A wired Internet interface connection may also be included to provide remote access to the radiation readings. The output unit 748 also includes a sound circuit 760 that receives the output signals from the processing module 736, and produces a sound or tone as an audio indicator. In some embodiments, an actuated audio indicator indicates a radiation level above a predetermined or programmable threshold, such as, for example, 4 pCi. Audio indication can occur immediately after the radiation level exceeds the predetermined or programmable threshold, or after the radiation level exceeds the threshold for a predetermined or programmable period of time, such as, for example, between 2 to 30 days. In other embodiments, an actuated audio indicator indicates a startup and/or an initialization of a diagnostic run, low battery, other diagnostics or actuator feedback, and the like. Furthermore, in some embodiments, the output unit 748 is programmed or structured to be actuated for a predetermined amount of time, such as, for example, 15 seconds, to conserve electrical power. In some cases, the output signals that drive the sound circuit 760 has a predetermined duty cycle. To conserve electrical power, the duty cycle of the output signal is generally minimized or reduced, and/or the predetermined amount of time can also be preset to have millisecond-long, second-long, minute-long, or hour-long intervals.

The threshold at which the audio indicator activates to emit audio can be predetermined or programmable. In instances where the threshold is predetermined, the radon monitor 700 is manufactured and distributed with a single predetermined threshold that cannot be changed by a consumer or other entity. For example, in the United States, the EPA has established a hazard threshold level of radon gas that is 4 picocuries (pCi) per hour per liter of air. Accordingly, radon monitors 700 distributed in the United States that have predetermined thresholds are sold with a predetermined threshold of 4 pCi per hour per liter of air. Radon monitors 700 having a predetermined threshold can be distributed in countries other than the United States. However, these countries other than the United States may have hazard threshold levels of radon gas different than that of the United States. Accordingly, the radon monitors for the countries other than the United States can be set with a predetermined threshold in accordance with their particular country's hazard threshold level of radon gas. In instances where the threshold is programmable, the radon monitor can be manufactured and distributed with a factory threshold and the consumer or other entity can re-program the radon monitor to have a different threshold. In some embodiments, the radon monitor may be re-programmed an infinite number of times. In other embodiments, the radon monitor may be re-programmed a definite number of times.

A power supply module 764, such as, for example, a battery, generally powers the radon monitor 700. In the illustrated embodiment, the power supply module 764 supplies an amount of power to components of the radon monitor 700 at a variety of power levels, such as, for example, high and low levels. For example, when the processing module 736 is operating in an awake mode (or a high power mode), the processing module 736 draws a relatively high amount of electrical power or current, such as, for example, milliamps, from the power supply module 764. When the processing module 736 is operating in a sleep mode (or a low power mode), the processing module 736 draws a relatively low amount of electrical power or current, such as, for example, microamps, from the power supply module 764. Operation of the processing module 736 in the sleep mode facilitates operation of the monitor 700 on battery power for extended periods of time.

The radon monitor 700 also includes a low voltage detection module 768 to detect an amount of voltage supplied by the power supply module 764. When the amount of voltage supplied by the power supply module 764 falls below a predetermined level, such as, for example, 4.6 V, the low power detection module 768 sends a low power detected signal to the processing module 736. When the processing module 736 receives the low power detected signal, the processing module 736 generates an output signal indicative of a low level of electrical power supplied by the power supply module 764. In turn, the output unit 748 is actuated to produce corresponding outputs.

The radon monitor 700 also includes a timing module 772 to produce a pulse signal to trigger the processing module 736 or other components, such as the detection module 704, of the radon monitor 700. The timing module 772 can generate the pulse signal based on a regular or irregular predetermined or programmed time. The timing module 772 can also generate the pulse signal in response to signals generated by the actuator 752, which is typically actuated by a user. Although the timing module 772 is shown as an external circuit with respect to the processing module 736, the timing module 772 can also be intrinsic to the processing module 736 in other embodiments. In some embodiments, the timing module 772 is configured to run at a low voltage level, such as, for example, 3.3 V nominal, to conserve electrical power.

In the illustrated embodiment, the sensing unit 716 is designed to use a very low or substantially minimum amount of electrical power while operating. Some of the components of the radon monitor 700, such as, for example, the timing module 772, are also designed to consume a relatively low amount of electrical power while operating. Other components, such as, for example, the processing module 736 and the output unit 748, draw a relatively high amount of electrical power. To conserve electrical power, the timing module 772 is structured to power the high electrical power consuming components on a time-limited basis. That is, time periods are limited at which the power supply module 764 powers the high electrical power consuming components. Similarly, the timing module 772 is also structured to continuously power the low electrical power consuming components at a very low or substantially minimum level, such that the radon monitor 700 can repetitively detect the radiation level.

Figure 2A:
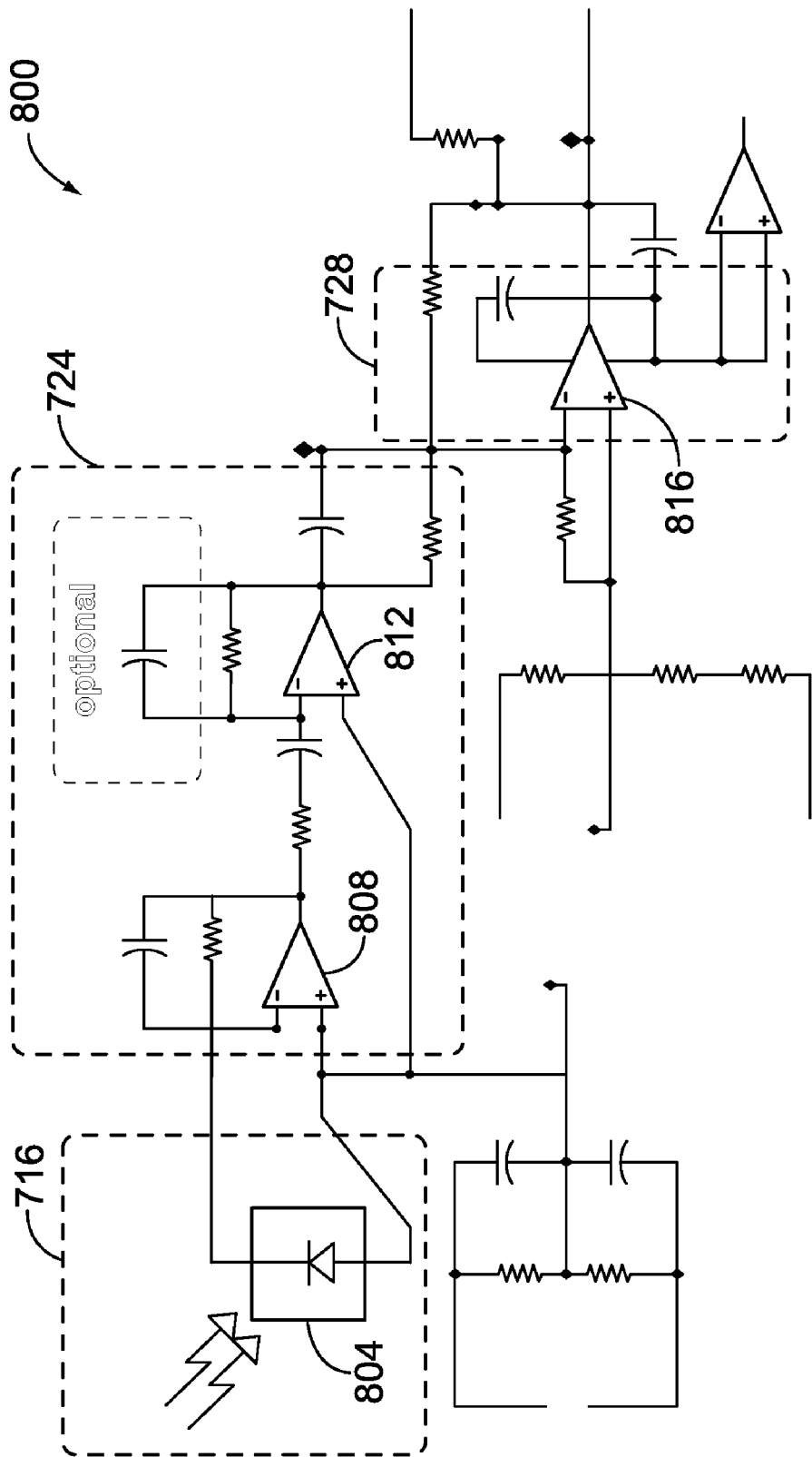
FIG. 2A is a first exemplary schematic of a detection module for use with the radon monitor of FIG. 1.
Figure 2B:
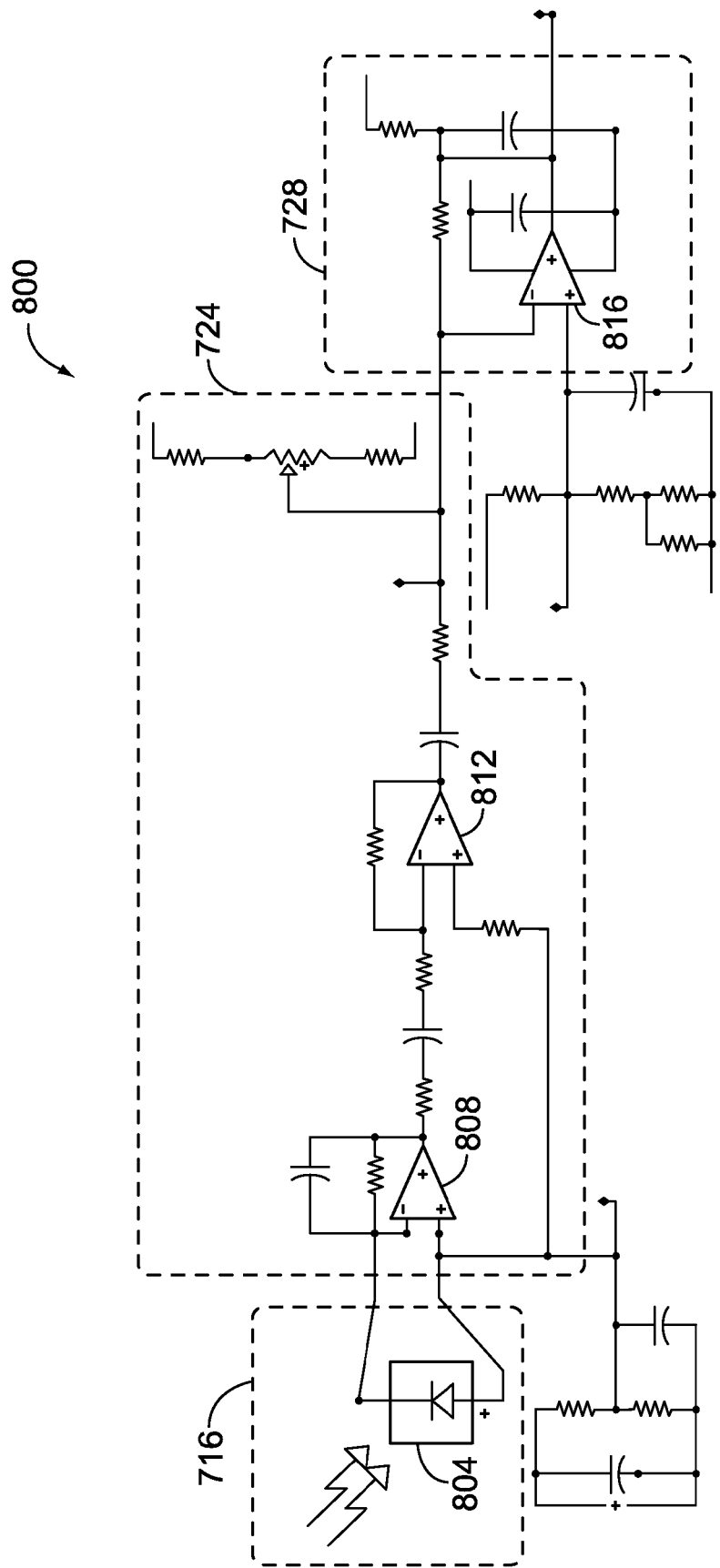
FIG. 2B is a second exemplary schematic of a detection module for use with the radon monitor of FIG. 1.

FIGS. 2A and 2B are exemplary schematics of two suitable detector circuits 800 for use with the detection module 704 of the radon monitor 700, wherein like numerals refer to like parts. As a portion of the sensing unit 716, each detector circuit 800 includes a detector 804, such as, for example, a PIN photodiode to detect a presence of ionizing radiation energy. For example, when an atom of radon gas decays in the sampling unit 712, the decaying atom emits an alpha particle with an amount of energy. When the alpha particle strikes the photo detector 804, the energy is transferred from the alpha particle to the photo detector 804. Particularly, the energy released by the particle creates a current perturbation in the junction of the photo detector 804, thereby creating a current fluctuation in the photo detector 804 and a current output signal in response to the current fluctuation.

In the illustrated embodiments, the signal translator 724 includes a transimpedance amplifier stage 808 and a voltage normalization amplifier stage 812. The transimpedance amplifier stage 808 translates the current output signal into a relatively low analog voltage signal, typically, in microvolts or nanovolts. The voltage normalization amplifier stage 812 then translates, amplifies, and/or normalizes the low analog voltage signal from, for example, a microvolt or nanovolt signal to a normalized analog voltage signal, e.g., 1 V peak, each time energy from an ionizing radiation is detected. The pulse generator 728 includes a comparator 816 which translates the normalized analog signal into a level acceptable by the processing module 736.

To provide accurate, unbiased test results from the radon monitor 700, it is desirable to detect any unusual influences that occur during testing. Unusual influences may include human interaction, otherwise known as tampering. Tampering with the operation of the radon monitor can greatly affect the test results. Consequently, the radon monitor 700 also includes a tamper proofing module 776 (FIG. 1) to detect if aspects of the radon monitor 700 have been tampered with during radon monitoring processes, detailed hereinafter. Tampering may include, for example, opening a window to allow fresh air into the environment, blowing a fan on the radon monitor or otherwise actively venting the environment in which the radon monitor 700 is located, turning off the radon monitor, placing an item over the radon monitor or otherwise inhibiting air flow to the radon monitor, moving the radon monitor to a different location within the environment or building, etc.

Figure 3:
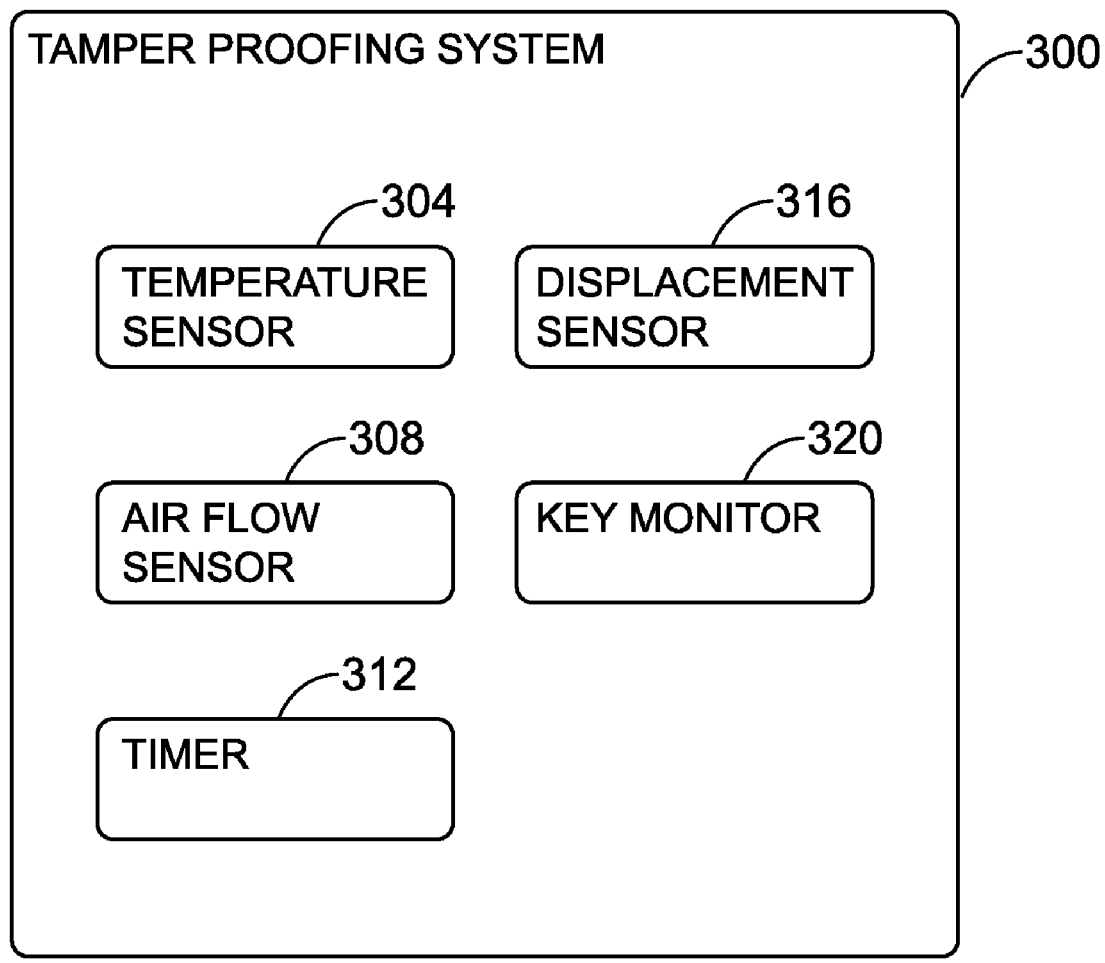
FIG. 3 is a system block diagram of a tamper proofing system of the radon monitor of FIG. 1.
Figure 4:
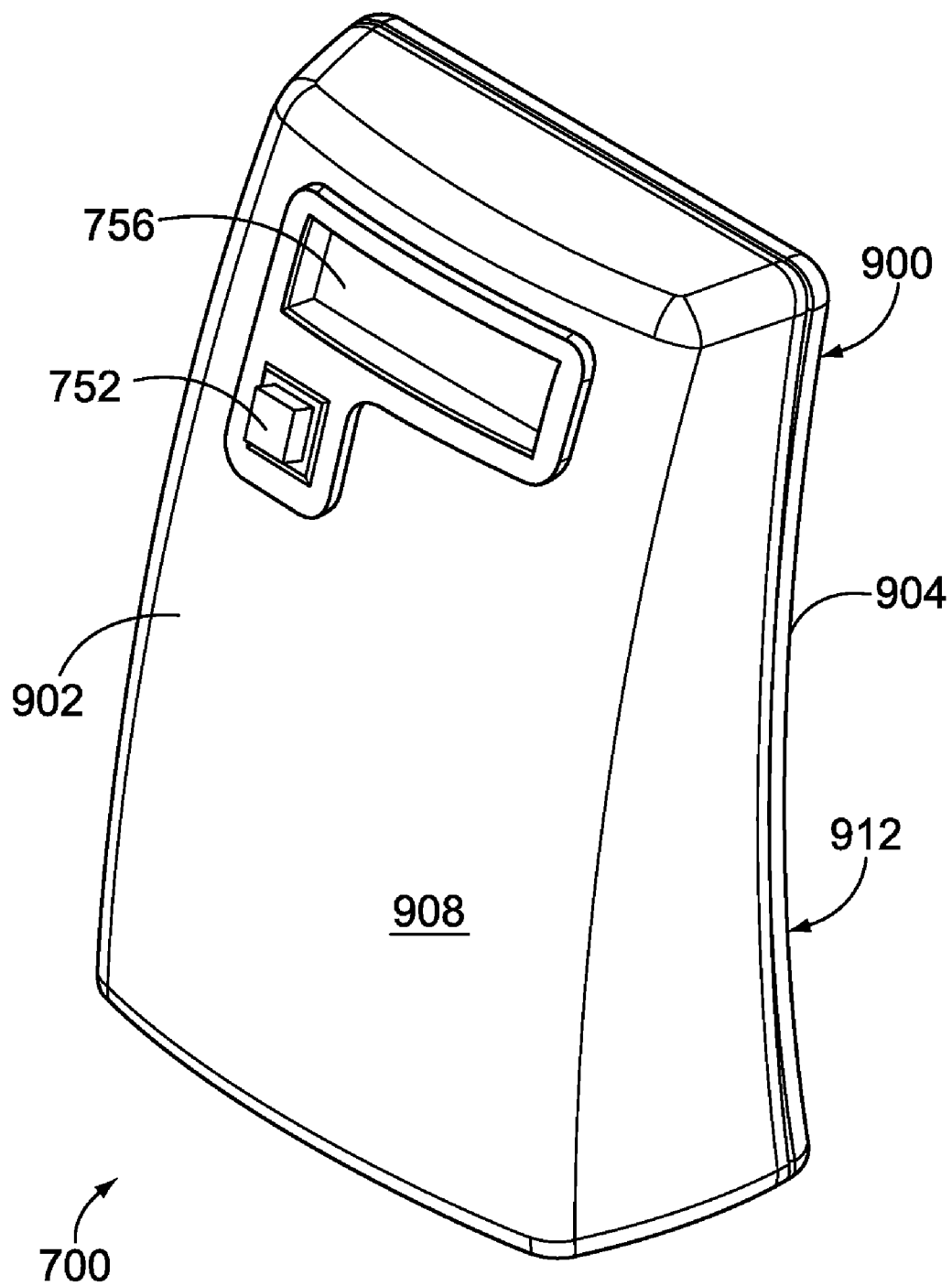
FIG. 4 is a front perspective view of an exemplary application of the radon monitor represented in the diagram shown in FIG. 1.

FIG. 3 shows an exemplary tamper proofing system 300 for use with the tamper proofing module 776 of FIG. 1 in a block diagram format, and wherein like numerals refer to like parts. Changes in temperature and relative humidity are indicators that the radon monitor has been tampered with by, for example, moving the radon monitor, affecting the conditions of the environment in which the radon monitor is located, etc. Both temperature and relative humidity can be measured to determine if tampering has occurred. To detect a change of temperature surrounding the radon monitor 700, the tamper proofing system 300 includes a temperature sensor 304 to measure a surrounding temperature of the radon monitor 700. For example, when the radon monitor 700 is activated to monitor radon levels in the monitoring process, the temperature sensor 304 measures an initial temperature of the environment in which the radon monitor 700 is located. The radon monitor 700 then stores the initial temperature in the memory module 742. The temperature sensor 304 then repetitively measures subsequent surrounding temperatures at various predetermined times. The tamper proofing system 300 sends the measured temperatures to the processing module 736, which may store the measured temperature in the memory module 742. Furthermore, the processing module 736 determines a difference between the initial temperature with subsequently measured temperatures. In some embodiments, if the difference between the initial temperature reading and the subsequent temperature readings is sufficiently great, the tamper proofing system 300 sends a tampering signal to the processing module 736. The tamper proofing system 300 can send a tampering signal to the processing module 736 immediately upon the difference becoming significantly great or after a predetermined or programmable period of time. The processing module 736 receives the tampering signal and logs a tampering time and a tampering type in the memory module 742. Relative humidity and changes in relative humidity can be measured and interpreted in the same manner as temperature described herein, except sensors capable of measuring relative humidity are used instead of temperature sensors.

In some embodiments, to prevent tampering with the radon monitor 700 by blowing air over the radon monitor 700 with a fan or by opening a window, or by inhibiting air flow to the radon monitor 700 by sealing, enclosing, or covering the radon monitor 700, the tamper proofing system 300 includes an air flow sensor 308 that determines a flow of air near the radon monitor 700. In some embodiments, the air flow sensor 308 can measure a quantity or speed of air flowing through or around the radon monitor 700. As such, similar to the temperature sensor 304, the processing module 736 detects an initial reading and subsequent readings to identify any changes of air flow in the monitoring process. When the changes exceed some predetermined thresholds or tolerances, the air flow sensor 308 sends a tampering signal to the processing module 736. Similar to the temperature sensor 304, the tampering signal can be sent by the air flow sensor 308 either immediately upon exceeding the threshold or after a predetermined or programmable period of time.

In some embodiments, the radon monitor can deactivate or turn-off upon sensing tampering. The radon monitor 700 can include a timer 312 to identify a deactivation time, among other things.

In other embodiments, the radon monitor 700 is preset to be activated for a predetermined amount of time, such as, for example, 72 hours. This amount of time is stored in the timer 312. In such a case, the radon monitor 700 continues to monitor the radon level until the radon monitor 700 reaches the predetermined amount of time (e.g., 72 hours) and is deactivated. However, if the radon monitor 700 is deactivated before the expiration of the predetermined time stored in the timer 312, the timer 312 will generate a tampering signal and send the signal to the processing module 736. In turn, the processing module 736 receives a timer tampering signal, stores a tampering event, and sends a signal to the output unit 748, which will produce a desired output.

In some embodiments, the tamper proofing system 300 includes a displacement sensor 316 to detect any displacement of the radon monitor 700 after the radon monitor 700 has been activated. Exemplary displacement sensors include, but are not limited to, a pressure sensor, mercury switch, humidity sensor, motion sensor, accelerometer, Hall effect sensor, capacitance sensor, tap or shock sensors, and the like. The displacement sensor 316 measures an appropriate parameter, such as, for example, pressure, when the radon monitor 700 has been activated. The radon monitor 700 then sets the measured parameter as a base. The processing module 736 takes subsequent measurements of the parameter (e.g., pressure) against the base. Deviations of the subsequent parameter can be indicative of a movement of the radon monitor 700. In some embodiments, when the displacement sensor 316 senses that a subsequent parameter deviates from the base, or deviates from the base by a preset amount, the processing module 736 and/or the displacement sensor 316 generate(s) a tampering signal and stores the tampering signal. In some embodiments, the radon monitor 700 will terminate operation upon sensing a tampering signal associated with the displacement sensor 316.

In some embodiments, the tamper proofing system 300 also includes a key monitoring module 320 to monitor key touches or changes after the radon monitor 700 has been activated. For example, after the monitor 700 has been activated, if there are unauthorized changes in the input unit 744, the key monitoring module 320 can be set to generate a tampering signal. When the processing module 736 receives the tampering signal, the processing module stores the tampering signal. In some embodiments, the processing module 736 may activate the output unit 748 to indicate an appropriate output through the display 756 or the sound circuit 760. In some embodiments, the radon monitor 700 also includes a lockout function that would require a user to enter a keycode via the input unit 744 to unlock and allow manipulation of the radon monitor 700. Without a proper keycode, the radon monitor 700 remains locked and may record an event associated with an improperly entered keycode.

It should be understood that recording, analysis, and computing of the data generated by these various tamper proofing capabilities of the radon monitor 700 can be performed by internal or external software, such as, for example, software stored in a personal computer, or other computing device, rather than by on-board components of the radon monitor 700.

With reference to FIGS. 4-8, the radon monitor 700 represented in the system block diagram of FIG. 1 is illustrated in an exemplary application that is not meant to be limiting. The monitor 700 is capable of having different configurations and applications. The monitor 700 includes a housing 900 having a first portion 902 and a second portion 904 connectable together to collectively form the housing 900 and define a cavity 906 within the housing 900. Various components of the monitor 700 are positioned in the cavity 906, detailed hereinafter. In the illustrated embodiment, the display 756 is supported by the housing 900 in a window defined in a front surface 908 of the housing 900. In some embodiments, the display 756 is a liquid crystal display ("LCD") having a two line, thirty-two character configuration. Alternatively, the display 756 could be an LCD having different configurations. Also, in other embodiments, the display 756 could be a variety of other types of displays such as, for example, an array of light emitting diodes ("LED's") or a PC type computer connected to the radon monitor 700 via a serial or parallel interface or a wired or wireless interface such as those described above. In the illustrated embodiment, the input unit 744 is supported in the front surface 908 of the housing 900 and is a depressible actuator 752. In other embodiments, the actuator 752 may be a slidable actuator, a rotatable actuator, a touch screen, a toggle switch, a keypad, and the like. In embodiments where the input unit 744 is a touch screen, the touch screen may substitute for the display 756 and perform all the functions and operations performed by the display 756. The input unit (i.e., the actuator 752) has many operations including, for example, but not limited to, turning the radon monitor 700 on and off, establishing time periods for the timing module 772 (e.g., showing a two day radiation level average or a thirty day radiation level average), transferring the radon monitor 700 between the sleep mode and awake mode, resetting and/or re-initiating operation of the radon monitor 700 when a new test is desired or when the radon monitor 700 is moved to a new location, resetting user programmable parameters, disabling the sound alarm for low battery or radon action level exceeded permanently or for a limited period of time, entering a keycode to lock and unlock the radon monitor 700, and the like.

Figure 5:
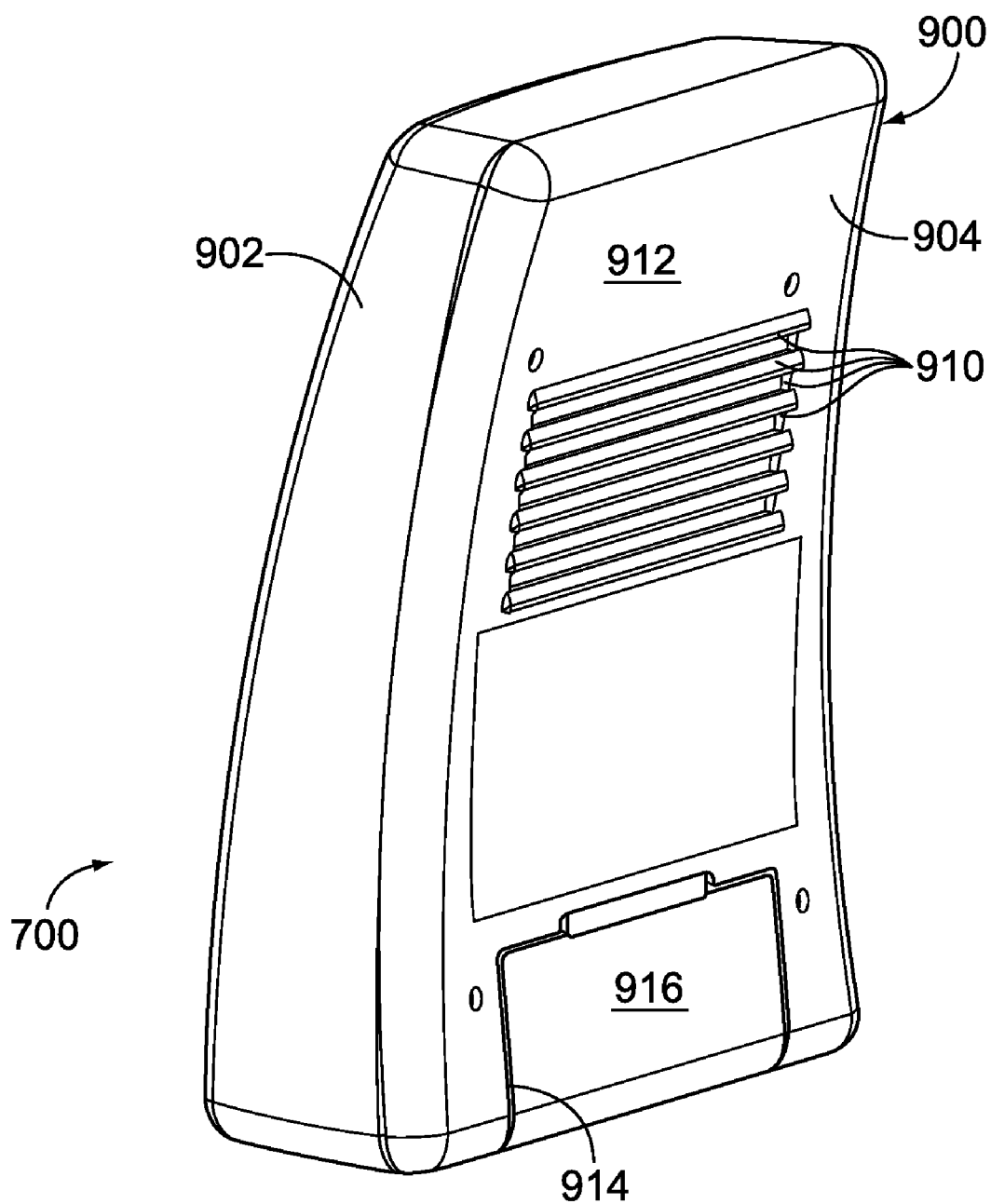
FIG. 5 is a rear perspective view of the radon monitor shown in FIG. 4.
Figure 6:
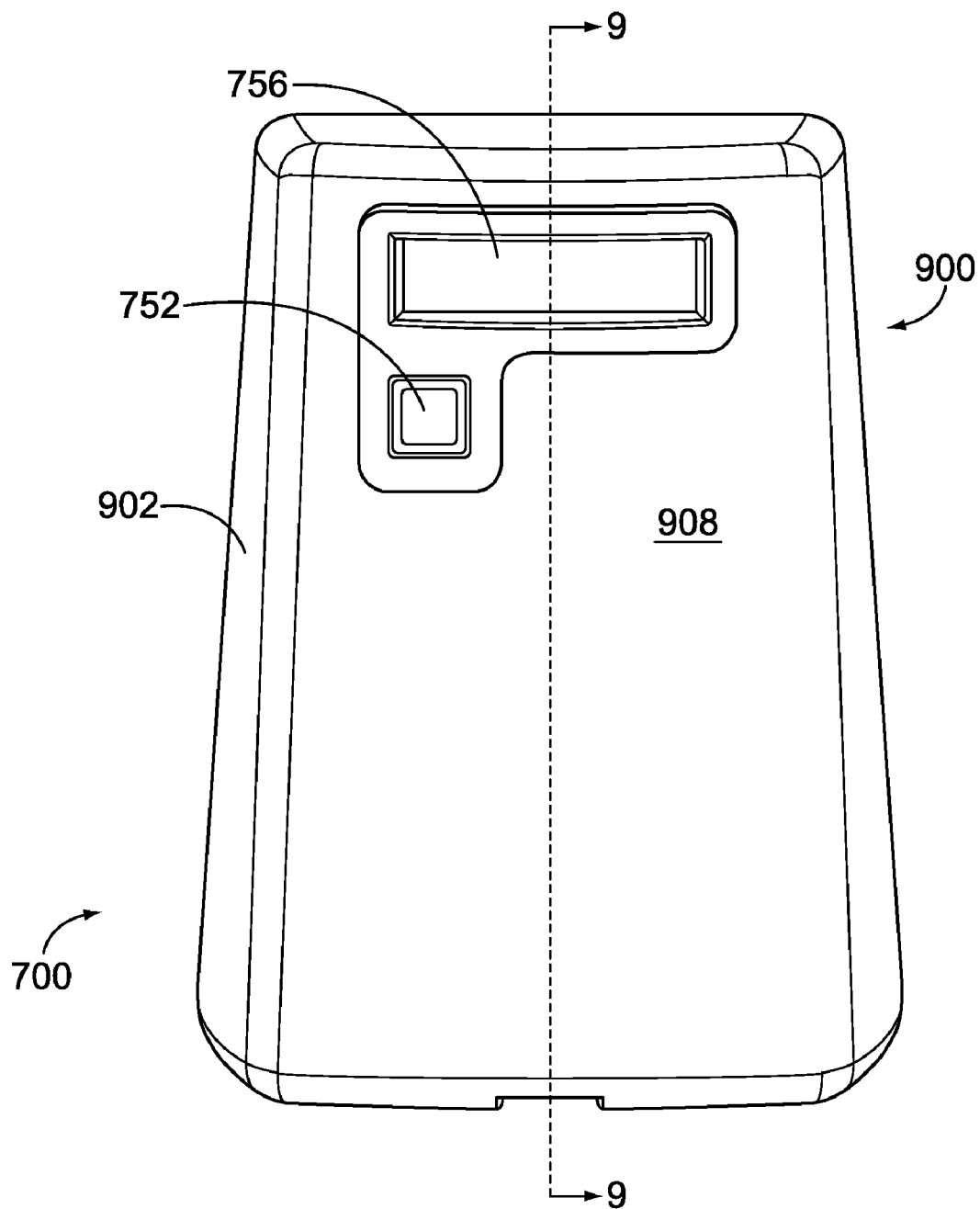
FIG. 6 is a front view of the radon monitor shown in FIG. 4.
Figure 7:
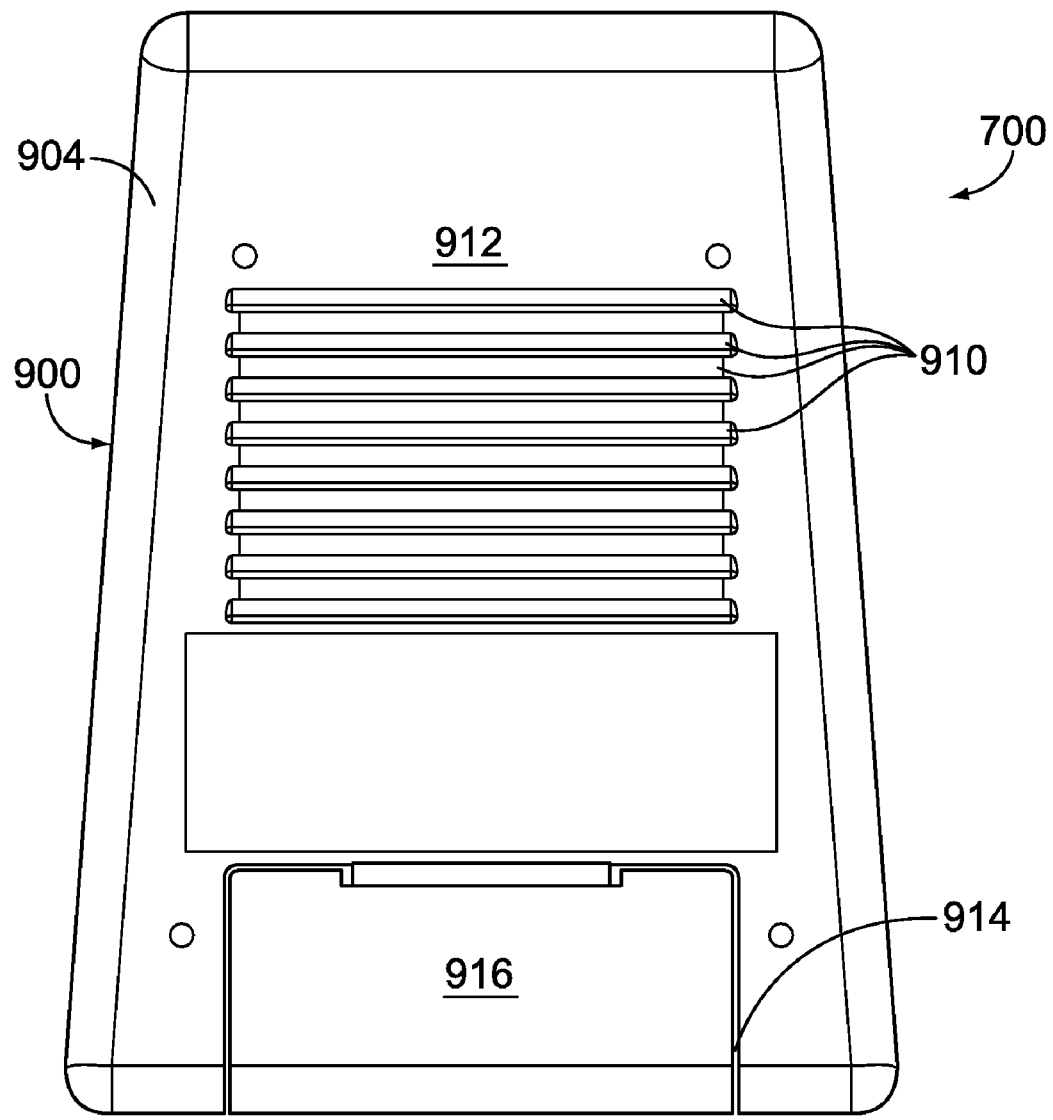
FIG. 7 is a rear view of the radon monitor shown in FIG. 4.
Figure 8:
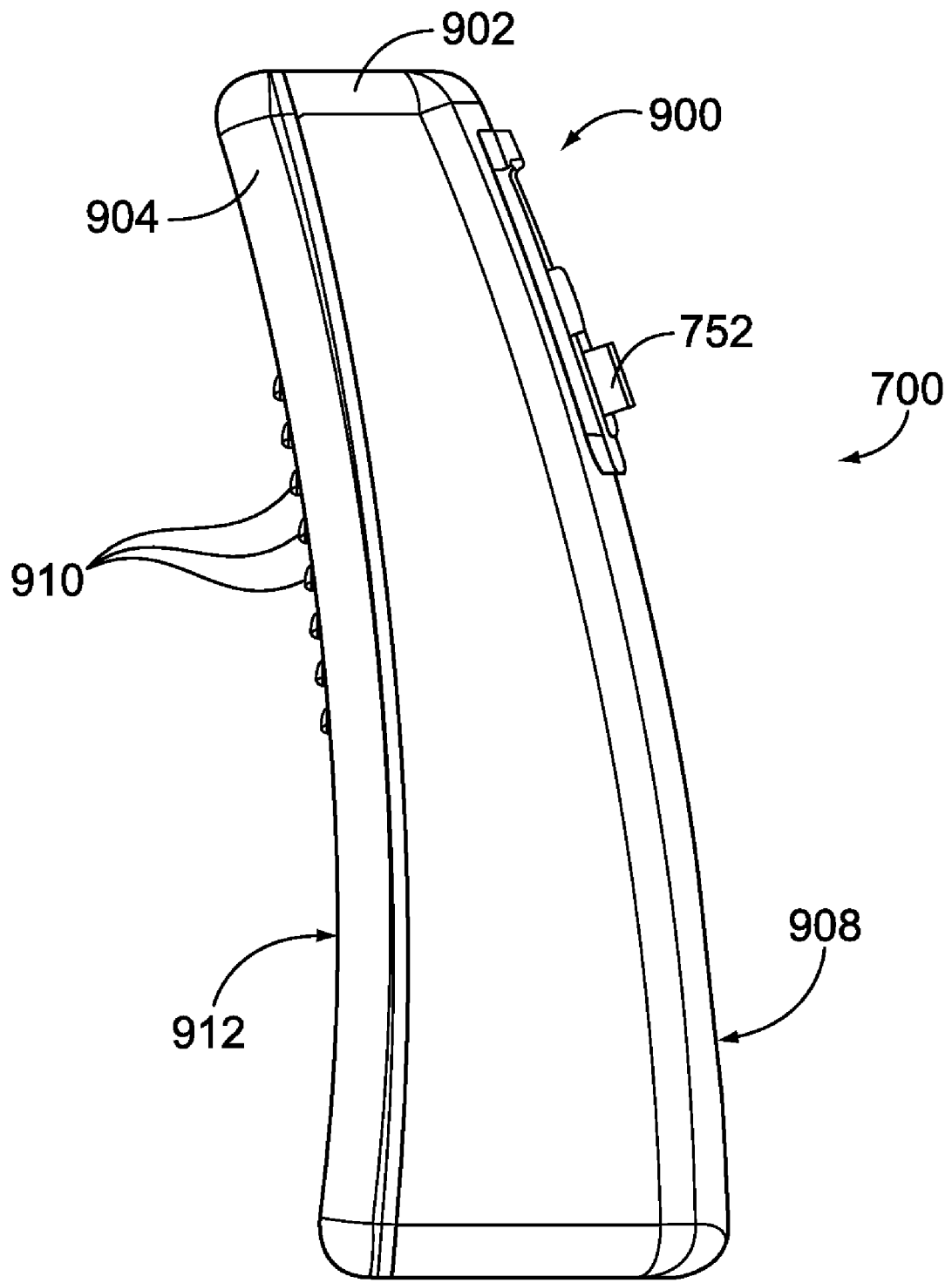
FIG. 8 is a right side view of the radon monitor shown in FIG. 4.

With particular reference to FIGS. 5, 7, and 8, the monitor 700 includes a plurality of openings in the form of louvers 910 defined in a rear surface 912 of the housing 900 for allowing air from the environment to diffuse into and out of the housing 900. The housing 900 defines a receptacle 914 near a bottom thereof for receiving and supporting the power supply module 764. As indicated above, the power supply module 764 in the illustrated embodiment is at least one battery 764. A cover 916 is removably connectable to the housing 900 over the receptacle 914 to selectively cover and uncover the receptacle 914 in order to secure the power supply module 764 in the receptacle 914 or facilitate removal and replacement of the power supply module 764. The power supply module 764 is a low-voltage power supply module capable of providing the necessary power for all operations of the monitor 700. By having a low-voltage power supply module 764 on-board, the monitor 700 is easily portable and can be placed in environments without AC power sources available, accessible, or inconveniently located. In some constructions, the power supply module 764 includes four (4) C-type batteries for powering the monitor 700. In such constructions, the four (4) C-type batteries each have a nominal voltage of 1.5 volts and, when connected in series, provide 6 volts to power the monitor 700. In other constructions, the power supply module 764 may be other numbers of batteries, including one (1), and other types of batteries, fuel cells, or other self-contained sources of electrical power for powering the monitor 700. As described above, the monitor 700 includes an awake mode and a sleep mode. In the awake mode, the monitor 700 draws typical amounts of power from the power supply module 764 to conduct normal operations. In the sleep mode, the monitor 700 draws lower amounts of power, or no power at all, and the monitor 700 typically enters into the sleep mode after a predetermined or programmable period of time. The sleep mode assists in extending the operational time of the radon monitor 700 by decreasing the power demand on the power supply module 764. As an example, if the power supply module 764 comprises four (4) C-type batteries and the radon monitor 700 is operated under normal operation, the radon monitor 700 should operate for a minimum of about forty-five (45) days or a maximum of about one (1) year.

Figure 9:
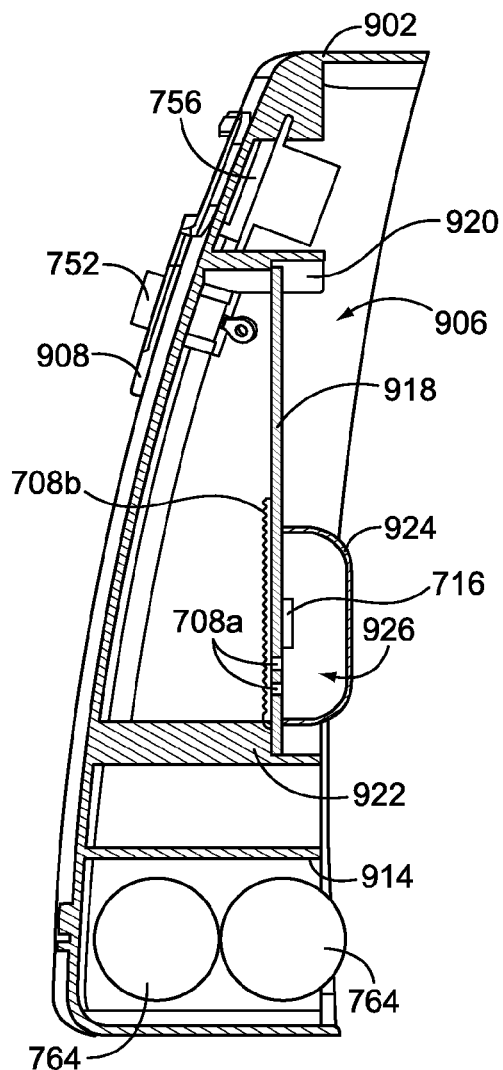
FIG. 9 is a cross-sectional view taken along line 9-9 in FIG. 6, shown with a second portion of a housing removed.

Referring now to FIG. 9, a cross-section of the monitor 700 is shown with the second portion 904 of the housing 900 removed. The monitor 700 further includes a circuit board 918, which is positioned in and supported by the housing 900 by upper and lower support members 920, 922. The sampling unit 712 includes a sampling chamber 924 positioned in the housing 900 and connected to a rear surface of the circuit board 918. In the illustrated construction, the sampling chamber 924 is semi-spherical in shape and has an outer surface and an internal surface, which defines a sampling cavity 926. In other constructions, the sampling chamber 924 can be other shapes, such as, for example cubical, conical, polygonal, and the like, and can be supported within the housing 900 in other manners. In some embodiments, the sampling chamber 924 is made of highly ferrous metal. Alternatively, the sampling chamber 924 can be made of other materials that block alpha particles and are air tight. The sampling chamber 924 is passive in that it does not require power and, accordingly, is not powered by the power supply module 764. Since the sampling chamber 924 is passive, the chamber 924 does not draw, attract, or otherwise influence radon gas or alpha particles into the sampling cavity 926 defined by the sampling chamber 924. Thus, the monitor 700 relies on diffusion of air and radon gas into and out of the sampling cavity 926 in order to test air in the environment. The sensing unit 716 is positioned in the sampling cavity 926 and only takes readings of alpha particles present in the sampling cavity 926 by decaying radon gas. In other words, any alpha particles present outside of the sampling chamber 924 are not detected by the sensing unit 716. The sampling chamber 924 also inhibits radio frequency (RF) from interfering with the sampling occurring in the sampling chamber 924.

To efficiently determine the radon levels present in the sampling cavity 926, given that radon levels are measured with respect to time and to volume of air, and that a relatively small radon monitor 700 enhances its portability, the sampling cavity 926 is designed to have a volume that is a binary fractional portion of fixed reference volume, such as one liter. For example, the sampling cavity 926 can be designed to have a volume that is a quarter (¼) of a liter, which is 250 cm$^3$. In such a case, an actual radon reading can be obtained by multiplying the radon level present by a factor of four to translate the radon level into annihilations per liter. In the illustrated embodiment, the sampling cavity 926 has a volume of $1/64^{th}$ of a liter and no portion of the sampling chamber 924 defining the sampling cavity 926 is spaced greater than 1.5 centimeters (cm) from the sensing unit 716. Alternatively, the sampling cavity 926 can have different volumes and portions of the sampling chamber 924 can be spaced different distances from the sensing unit 716. This illustrated embodiment of the sampling cavity 926 provides a volume of about 15.625 cm$^3$. In such cases, the actual radon reading is obtained by multiplying the radon level present in the volume of 15.625 cm$^3$ by a multiplier of 64. In digital processing of binary signals, the multiplier 64 is itself a power of 2, or $64=2^6$. As such, multiplication of 64 can be done efficiently with binary shifting. That is, shifting the binary signals indicative of the radon level present in the sampling cavity 926 six times will result in an actual radon reading with respect to a liter of air. In most cases, using binary shifting to multiply is more efficient than other types of multiplications performed by a controller. In other embodiments, other binary factors can also be used. In yet other embodiments, the processing module 736 can perform other types of multiplications of the present radon level to obtain an actual radon level reading.

Furthermore, essentially all parts in the sampling chamber 924 are within a predetermined radius of the sensing unit 716. In the illustrated embodiment, as described earlier, the sampling cavity 926 of the sampling chamber 924 has a shape of semi-sphere and a radius of about 1.5 cm with the sensing unit 716 being a center of the sampling cavity 926. Alternatively, the sampling cavity 926 can have different volumes and portions of the sampling chamber 924 can be spaced different distances from the sensing unit 716.

Figure 10:
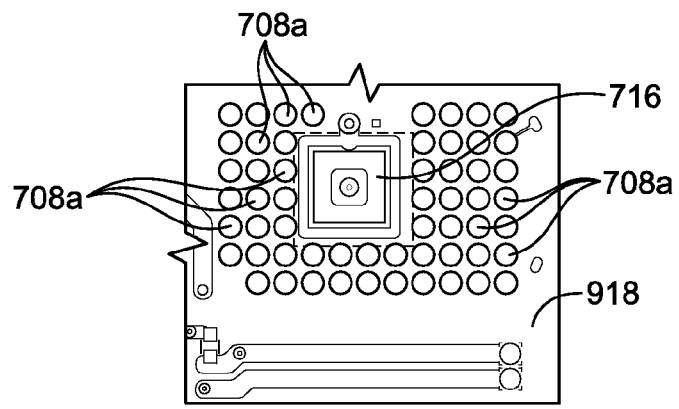
FIG. 10 is a front view of a portion of an exemplary circuit board of the radon monitor shown in FIG. 4.

With reference to FIGS. 9 and 10, the diffusion units include a plurality of apertures 708A and an optional membrane or filter 708B. The apertures 708A are defined in the circuit board 918 in close proximity to the sensing unit 716 and the location where the sampling chamber 924 is connected to the circuit board 918. The apertures 708A allow air to diffuse through the circuit board 918 and into and out of the sampling chamber 924. The filter 708B may optionally be attached to the circuit board 918 over the apertures 708A to reduce entry of undesired debris, such as dust, smoke, and the like, from entering the sampling chamber 924, while allowing air and any radon gas in the air to pass therethrough and into the sampling chamber 924. Alternatively, the filter 708B, if used, may be supported within the housing 900 in a different manner as long as the filter 708B is positioned to prevent entry of undesired debris into the sampling chamber 924.

Although the illustrated embodiment includes a single sampling chamber 924 and sensing unit 716, other embodiments may include additional sampling chambers 924 and sensing units 716 positioned on the same circuit board 918 or a different circuit board.

The embodiments described above and illustrated in the figures are presented by way of example only and are not intended as a limitation upon the concepts and principles of the present invention. Although particular constructions of the present invention have been shown and described, other alternative constructions will be apparent to those skilled in the art and are within the intended scope of the present invention.

We claim:

1. An apparatus for detecting radon in air, the apparatus comprising:
a housing defining a cavity;
a passive, non-electrically powered sampling chamber supported by the housing;
a divider supported by the housing and defining a boundary between the cavity and the chamber, the divider including a plurality of apertures to allow air flow between the cavity and the chamber; and
a detector for detecting radon in the chamber, wherein the sampling chamber defines a volume that is a fractional portion of a fixed reference volume, and
the fractional portion has a denominator that is a power of 2.

2. The apparatus of claim 1, wherein the sampling chamber is formed of metal and no portion of the sampling chamber is greater than 1.5 cm from the detector.

3. The apparatus of claim 1, wherein the detector is positioned on the divider and faces the sampling chamber.

4. The apparatus of claim 3, wherein the detector includes a positive-intrinsic-negative junction photodiode and the divider comprises a circuit board including a signal conditioning unit in communication with the detector, and a processing module for processing signals received from the detector via the signal conditioning unit.

5. The apparatus of claim 4, wherein the processing module periodically receives a signal corresponding to a radon level from the detector and compares the signal to a threshold level of radon and, upon determining that the signal corresponds to a radon level that exceeds the threshold level, activates an output unit.

6. The apparatus of claim 1, further comprising a processing module for processing signals received from the detector, memory, and a tamper detection system, the tamper detection system including a sensor for detecting a condition associated with the apparatus surroundings, wherein the processor periodically receives a signal from the sensor corresponding to the condition and stores a condition value in the memory, and wherein upon receiving a subsequent signal from the sensor corresponding to the condition, compares the subsequent signal with the stored condition value to determine whether the condition has changed by an amount that exceeds a threshold amount.

7. The apparatus of claim 6, wherein the tamper detection system includes at least one of the following:
 a) a temperature sensor for sensing a surrounding temperature;
 b) a relative humidity sensor for sensing a surrounding relative humidity;
 c) an air flow sensor for sensing a quantity of air flow in the vicinity of the apparatus.

8. The apparatus of claim 1, further comprising a power supply that is the exclusive source of electrical power for the apparatus, the power supply supported by the housing and consisting of one or more self-contained power sources.

9. The apparatus of claim 8, wherein the power supply includes a plurality of batteries each having a nominal voltage of 1.5 volts and connected in series.

10. The apparatus of claim 1, further comprising a processor communicating with the detector to receive a signal corresponding to a radiation level in the chamber, and wherein the processor converts the signal to a standardized radon reading with respect to the fixed reference volume of air using binary shifting.

11. The apparatus of claim 1, further comprising a processing module operable in an awake mode and a sleep mode, and a timing module, wherein the timing module regulates operation of the processing module to limit the time the processing module operates in the awake mode.

12. A radon monitor comprising:
 a housing defining a housing cavity therein and an opening in an exterior wall of the housing in fluid communication with the housing cavity, the opening allowing air to diffuse into and out of the housing cavity;
 an output unit supported by the housing; an input unit supported by the housing and operable to activate and deactivate the radon monitor;
 a circuit board positioned in the housing cavity and supported by the housing, the circuit board defining a plurality of apertures therethrough;
 a passive, non-electrically powered sampling chamber defining a chamber cavity, the sampling chamber positioned in the housing cavity for fluid communication between the chamber cavity and the housing cavity by way of the apertures in the circuit board to allow air to diffuse between the housing cavity and the chamber cavity; and
 a detector supported by the circuit board and at least partially positioned in the chamber cavity for detecting radon, wherein
 the sampling chamber defines a volume that is a fractional portion of a fixed reference volume, and
 the fractional portion has a denominator that is a power of 2.

13. The monitor of claim 12, wherein sampling chamber is coupled to the circuit board adjacent the apertures.

14. The monitor of claim 13, wherein the sampling chamber is formed of metal and no portion of the sampling chamber is greater than 1.5 cm from the detector.

15. The monitor of claim 14, wherein the circuit board includes a signal conditioning unit in communication with the detector, and a processing module for processing signals received from the detector via the signal conditioning unit.

16. The monitor of claim 15, wherein the detector is a positive-intrinsic-negative junction photodiode and the signal conditioning unit includes a pulse generator for converting an analog signal received from the detector to a digital signal, and a signal filtering unit.

17. The monitor of claim 12, further comprising a tamper detection system, the tamper detection system including a sensor for detecting a condition associated with the apparatus surroundings.

18. The monitor of claim 17, further comprising a processing module for processing signals received from the detector, and memory, and wherein the processing module periodically receives a signal from the sensor corresponding to the condition and stores a condition value in the memory, and wherein upon receiving a subsequent signal from the sensor corresponding to the condition, compares the subsequent signal with the stored condition value to determine whether the condition has changed by an amount that exceeds a threshold amount.

19. The monitor of claim 17, wherein the tamper detection system includes at least one of the following:
 a) a temperature sensor for sensing a surrounding temperature;
 b) a relative humidity sensor for sensing a surrounding relative humidity;
 c) an air flow sensor for sensing a quantity of air flow in the vicinity of the apparatus.

20. The monitor of claim 12, further comprising:
 a power supply that is the exclusive source of electrical power for the apparatus, the power supply supported by the housing and consisting of one or more self-contained power sources; a processing module operable in an awake mode and a sleep mode; and
 a timing module, wherein the timing module regulates operation of the processing module to limit the time the processing module operates in the awake mode to thereby reduce power consumption from the power supply.

21. The monitor of claim 12, further comprising a processor communicating with the detector to receive a signal corresponding to a radiation level in the chamber, wherein the processor converts the signal to a standardized radon reading with respect to the fixed reference volume of air using binary shifting.

22. An apparatus for detecting radon in air, the apparatus comprising:
 a housing defining a cavity;
 a sampling chamber supported by the housing;
 a detector for detecting radon in the chamber; and
 a self-contained power supply that is the exclusive source of electrical power for the apparatus, the power supply supported by the housing, wherein
 the sampling chamber defines a volume that is a fractional portion of a fixed reference volume, and
 the fractional portion has a denominator that is a power of 2.

23. The apparatus of claim 22, wherein the power supply includes a plurality of batteries each having a nominal voltage of 1.5 volts and connected in series.

24. The apparatus of claim 22, wherein the sampling chamber is a passive, non-electrically-powered sampling chamber.

25. The apparatus of claim 22, wherein the detector includes a positive-intrinsic-negative junction photodiode, the apparatus further comprising a circuit board including a signal conditioning unit in communication with the detector, and a processing module for processing signals received from the detector via the signal conditioning unit.

26. The apparatus of claim 22, further comprising a processing module that periodically receives a signal corresponding to a radon level from the detector and compares the signal to a threshold level of radon and, upon determining that the signal corresponds to a radon level that exceeds the threshold level, activates an output unit.

27. The apparatus of claim 26, wherein the processing module is operable in an awake mode and a sleep mode, the apparatus further comprising a timing module, wherein the timing module regulates operation of the processing module to limit the time the processing module operates in the awake mode.

* * * * *